Oct. 2, 1962  K. BREER ETAL  3,056,661
APPARATUS FOR THE MANUFACTURE OF POLYURETHANE PLASTICS
Original Filed May 27, 1955  3 Sheets-Sheet 1

INVENTORS:
ERWIN WEINBRENNER  KARL BEER
BY Elmer P. Rucker

ATTORNEY

Oct. 2, 1962   K. BREER ETAL   3,056,661
APPARATUS FOR THE MANUFACTURE OF POLYURETHANE PLASTICS
Original Filed May 27, 1955   3 Sheets-Sheet 3

INVENTORS:
ERWIN WEINBRENNER, KARL BREER,
BY Elmer P. Rucker
ATTORNEY

３,056,661
APPARATUS FOR THE MANUFACTURE OF POLYURETHANE PLASTICS

Karl Breer, Koln-Flittard, and Erwin Weinbrenner, Leverkusen-Bayerwerk, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware Continuation of application Ser. No. 511,738, May 27, 1955. This application Jan. 7, 1959, Ser. No. 785,526
Claims priority, application Germany May 28, 1954
6 Claims. (Cl. 23—285)

This invention relates to an apparatus for the manufacture of polyurethane plastics and, more particularly, to a new and novel apparatus for the manufacture of improved polyurethane plastics.

This application is a continuation of our copending application Serial Number 511,738, filed May 27, 1955, now abandoned.

It has been known heretofore to provide specially designed apparatuses for the manufacture of polyurethane plastics. Polyurethane plastics are obtained by reacting an organic polyisocyanate, an organic compound having reactive hydrogen atoms and a molecular weight of at least about 750 and, if desired, an activator mixture usually consisting of a cross-linking agent, such as, a glycol, an amino alcohol, a diamine, water, and the like, and a suitable catalyst. Inasmuch as the components of a polyurethane plastic react with each other at a high reaction velocity and with a corresponding rapid increase in viscosity, ordinary chemical reaction apparatuses, such as are disclosed in United States Patent Number 2,474,592, issued to F. A. Palmer on June 28, 1949; United States Patent Number 2,577,856, issued to J. F. Nelson on December 11, 1951; and United States Patent Number 2,582,899, issued to H. L. Barnebey et al. on January 15, 1952; are unsuitable for the manufacture of polyurethane plastics. Accordingly, specially designed chemical reaction apparatuses, such as is disclosed in United States Patent Number 2,764,565, issued to Peter Hoppe et al. on September 25, 1956, with which the parent application was copending, have been provided in which the components are separately introduced into an enclosed mixing chamber while stirring with the high speed stirrer mechanism and at least one of the components are introduced into the mixing chamber by injection. The heretofore known apparatuses are so arranged that the inflow of the components is located above the discharge nozzle of the mixing chamber so that the mixed components may discharge freely in a downward direction due to the specific gravity of the mixture. Such arrangement permits air to be drawn into leaks which may develop about the stirrer mechanism so that the resultant product may have voids and the like resulting from entrapment of air in the mixture.

It is, therefore, an object of the invention to provide an apparatus for the manufacture of improved polyurethane plastics. Another object of the invention is to provide an apparatus for the manufacture of polyurethane plastics which are free of bubbles of entrapped air. Still another object of the invention is to provide an apparatus for the manufacture of polyurethane plastics of an improved uniform quality.

Other objects will become apparent to those skilled in the art from the following detailed description of the invention with reference to the accompanying drawings in which.

Figure 1:
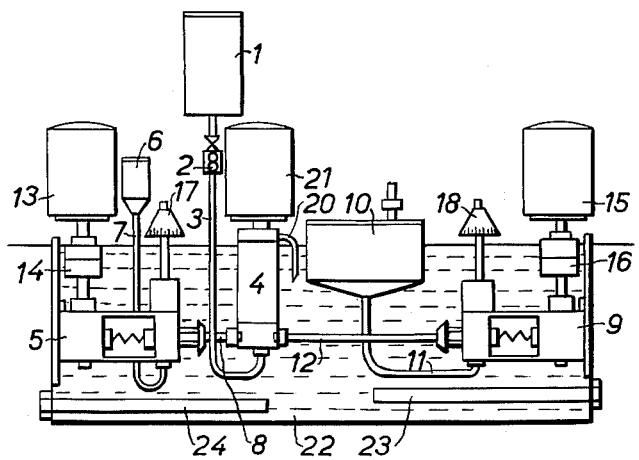
FIGURE 1 is a front elevation view of the apparatus of the invention.

The above objects and others are accomplished, generally speaking, by providing an apparatus in which the components of a polyurethane plastic are in a first step intimately contacted by injection of at least one of the components into a stream flowing under pressure of another component, and in a second step rapidly flowing the intimately contacted components upwardly into a mixing chamber where the intimately contacted components are further and rapidly admixed by means of a mechanical stirrer. The components are intimately contacted in any area adjacent the zone of active mechanical mixing. For example, this area may be in the bottom of the mixing chamber, subjacent the stirrer mechanism. In one preferred embodiment, however, the area of intimately contacting the components is in a conduit leading to the bottom of the mixing chamber.

The invention is predicated on the surprising discovery that polyurethane products having improved properties are obtained where the components are first intimately contacted by injecting at least one into another at pressures of from about 20 atmospheres to about 1,000 atmospheres and are subsequently mixed further by a mechanical stirrer. Immediately after the components are intimately contacted, reaction occurs and a polymeric chain containing urethane linkages begins to grow with a corresponding increase in viscosity. The apparatus is so designed that an elapsed time period of from about 3 to about 10 seconds occurs after the initial intimate contacting of the components by injection until the intimately contacted components receive a subsequent mixing with a mechanical stirrer. The subsequent mixing with a mechanical stirrer takes place in a relatively short period of time of from about 1 to about 5 seconds. The subsequent mixing rearranges the growing polymeric chains in such a manner as to insure a completely cross-linked product.

Moreover, the apparatus of the invention provides polyurethane plastics which are free of any bubbles of entrapped air by flowing the reaction mixture upwardly. This is of particular advantage where nonporous polyurethane plastics are manufactured. It is, however, an advantage where cellular polyurethane plastics are manufactured so that the cell size of the cellular polyurethane plastic is uniform throughout and is not altered by occasional relatively large bubbles of entrapped air.

Polyurethane plastics of an improved uniform quality are provided by an embodiment of the apparatus of the present invention in which the various components of a polyurethane plastic may be maintained at a uniform temperature. According to an embodiment of the invention, the mixing pumps, supply conduits, as well as the storage containers and the mixing chamber itself, may all be disposed in a common heating bath, or, if desired, may be located in separate heating baths. This arrangement permits components which may be extremely viscous to be readily and accurately admixed with the other components.

Any suitable organic compound having reactive hydrogen atoms and a molecular weight of at least about 750 may be used in accordance with the present invention. Inasmuch as the compound containing active hydrogen atoms and a molecular weight of at least about 750 is the primary component by weight, this component is often referred to as the "main component." Suitable organic compounds having reactive hydrogen atoms are, for example, polyesters, polyesteramides, polyalkylene ether glycols, and polythioethers. Polyesters may be obtained by reacting any suitable dicarboxylic acid, such as, for example, malonic acid, succinic acid, adipic acid, methyl adipic acid, sebacic acid, dihydromuconic acid, thiodipropionic acid, maleic acid, phthalic acid, terephthalic acid, tricarballyl acid, tartaric acid, and the like, with an excess of any suitable polyhydroxyl compound, such as, for example, ethylene glycol, diethylene glycol, triethylene glycol, polyethylene glycol, 1,2-propylene glycol, 1,4-butylene glycol, 1,6-hexanediol, glycerine, pentaerythritol, trimethanol propane, hexanetriol, and the like. Polyester amides may be obtained by reacting any of the aforementioned dicarboxylic acids with ethylene diamine, tetramethylene diamine, hexamethylene diamine, N-methyl propylene triamine, piperazine, phenylene and naphthalene diamines, ethanolamine, propanolamine, N-methyl diethanol amine, hydroxyethyl aniline, and the like.

Any suitable polyalkylene ether glycol may be used in accordance with the present invention. Suitable polyalkylene ether glycols may be obtained, for example, by condensing suitable alkylene oxides containing from two to five carbon atoms, such as, for example, ethylene oxide, propylene oxide, butylene oxide, and amylene oxide, or mixtures thereof. Polyalkylene ether glycols may also be modified with any suitable trihydric alcohol, such as, for example, trimethanol propane, glycerine, and the like, to provide branched polyaddition products.

Polythioether glycols may be prepared by condensing any suitable thioglycol, such as, thiodiglycol, with a polyhydric alcohol, such as, for example, ethylene glycol, and the like.

Any suitable organic polyisocyanate may be used in accordance with the present invention. Examples of suitable organic polyisocyanates are hexamethylene diisocyanate, 2,4-tolylene diisocyanate, 2,6-tolylene diisocyanate, mixtures of 2,4 and 2,6-tolylene diisocyanate, naphthalene diisocyanate, phenylene diisocyanate, 1-isopropyl-2,4-benzene diisocyanate, 4,4'-diphenyl methane diisocyanate, diphenyl-4,2,4'-triisocyanate, and the like.

Any suitable activator mixture may be used in accordance with the invention. Generally, the activator mixture comprises at least one cross-linking agent and at least one catalyst, however, the catalyst may be dispensed with, if desired. Suitable cross-linking agents are, for example, the polyalcohols, such as, ethylene glycol, trimethanol propane, and the like, polyamines, such as, ethylene diamine, diethylene triamine, and the like, and water. Suitable catalysts include the tertiary amines, such as, dimethylhexahydroaniline, diethylhexahydroaniline, N-methyl morpholine, and bisdiethylaminoethanol adipic.

Figure 2:
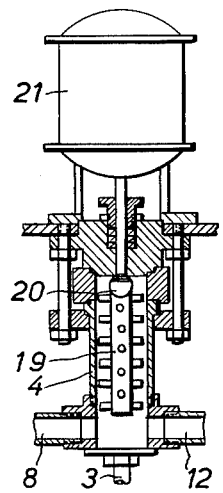
FIGURE 2 is a detailed partial cross-sectional view showing one embodiment of the mixing chamber of the invention.

The main component, which is an organic compound having reactive hydrogen atoms and a molecular weight of at least about 750, is supplied from a suitable container 1 by a gear pump 2 and is forced under pressure through a pipe 3 to the bottom of a mixing chamber 4. At the same time, by means of a high pressure piston pump 5 a cross-linking agent, for example, butylene glycol, or the like, which is supplied to said pump by a pipe 7 from a suitable container 6, is injected through a pipe 8 into the lower part of the mixing chamber 4 transversely to the direction of inflow of the organic compound having reactive hydrogen atoms. An organic polyisocyanate which flows into a high pressure pump 9 from a suitable container 10 by way of a pipe 11 is at the same time injected by said pump through a pipe 12 into the lower part of the mixing chamber 4, transversely of the inflow direction of the main component and opposite to the direction of inflow of the cross-linking agent. The high pressure pump 5 is driven by any suitable source 13, such as, for example, an electric motor through the clutch 14 and the high pressure pump 9 is driven by a suitable power source 15 through a clutch 16. The amount of material fed into the pumps 5 and 9 are controlled by regulators 17 and 18, respectively. The intimately contacted mixture of the components then passes rapidly upwardly to the upper part of the chamber 4 and supplementary mechanical mixing is affected by rotating a stirrer mechanism 19 as is best shown by FIGURE 2. The final pourable mixture obtained passes out of the top of the mixing chamber 4 through a pipe 20 and is then introduced into suitable molds and the like (not shown). The driving motor for the stirrer is indicated at 21.

The mixing chamber 4 and also the high pressure piston pumps 5 and 9 and the container 10 are arranged in a heating bath, for example, a heated oil bath, which is located in tank 22. The bath is heated by means of electric heater bars 23 and 24.

Figure 3:
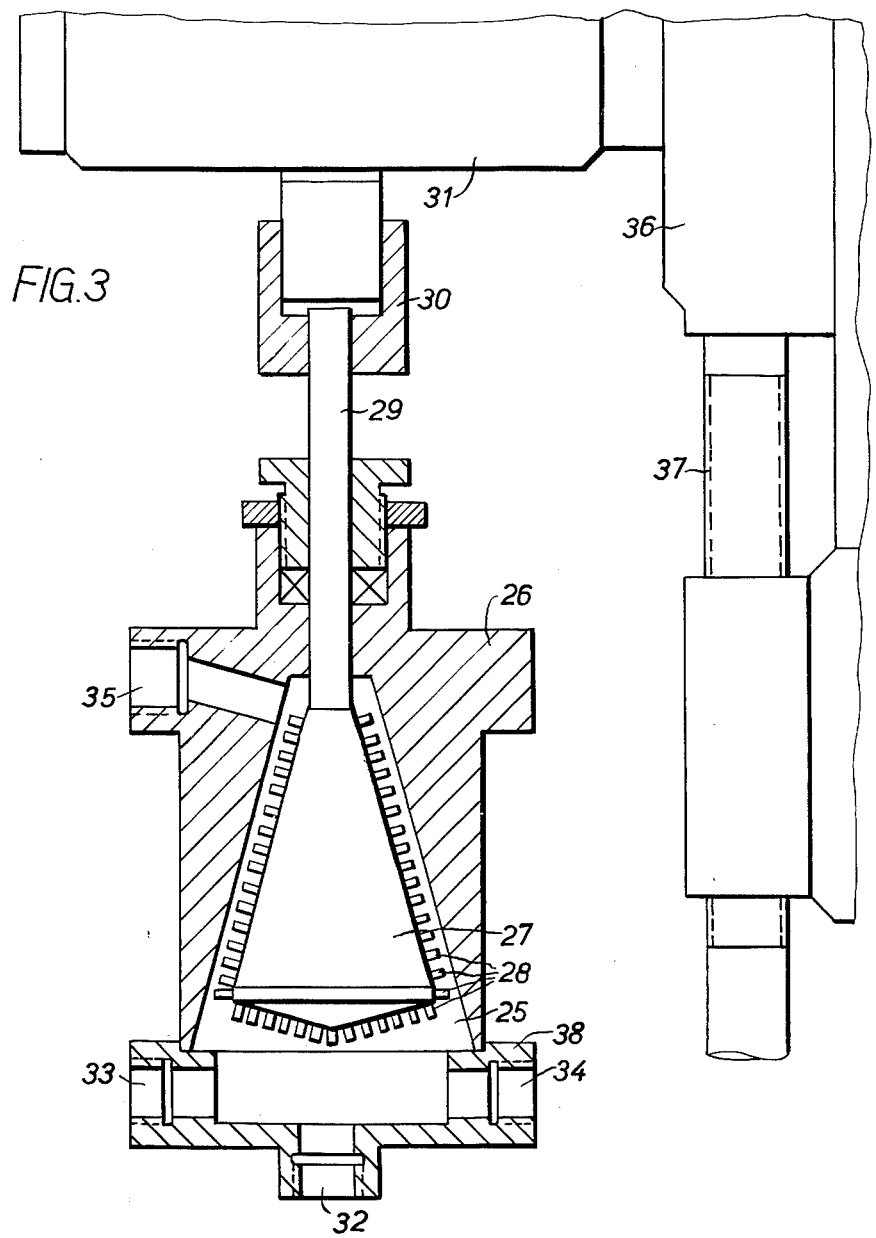
FIGURE 3 is a detailed cross-sectional view of still another embodiment of the mixing chamber of the invention.
Figure 4:
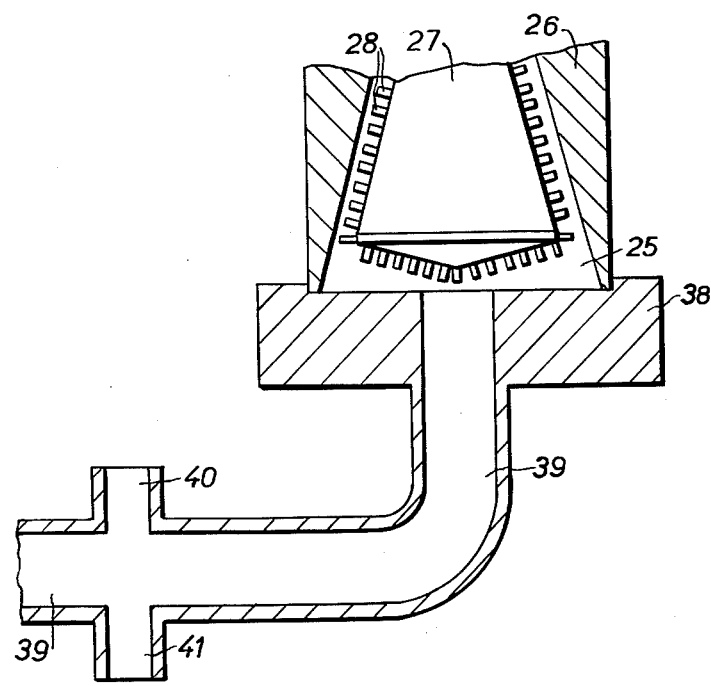
FIGURE 4 is a detailed sectional view showing a still further embodiment of the mixing chamber of the invention.

There is provided in one preferred embodiment a device which permits a variable volume or working capacity, of the mixing chamber during operation. This is provided in order to make allowance for the time necessary to carry out the reaction taking place in the mixing chamber. This preferred embodiment is best illustrated by FIGURE 3 in which the mixing chamber 25 of the housing 26 is dimensioned like a truncated cone. A stirrer means 27 is positioned inside the chamber 25 which is of substantially similar configuration therewith. The surface of the stirrer means 27 is provided with a plurality of tooth-like projections 28. The stirrer means is fixed to the shaft 29 by means of the clutch 30. The bottom 38 of the casing 26 has an inlet opening 32 for the main component and inlet openings 33 and 34 for the other components. A discharge opening 35 for the final mixture is provided in the upper section of the casing 26. The electric motor 31 is mounted on a sliding carriage 36 by means of flanges. This sliding carriage 36 may be lifted and lowered by means of the spindle 37. The spindle 37 is driven reversibly, for instance, by means of an electric motor via a gear (not shown in the drawings). The reaction components enter the bottom of the mixing chamber through the inlet openings 32, 33, and 34, are intimately contacted together, and thereafter passed upwardly in the mixing chamber and are further mixed by the action of the rotating stirrer means 27. The final pourable mixture issues from the chamber 25 through the opening 35 and then can be directed to suitable molds and the like. By raising or lowering the stirrer means 27 positioned inside the mixing chamber 25, the volume of the mixing chamber 25 and, accordingly, the duration or the reaction time of the mixture may be varied while the quantities of the admitted individual components remain constant. FIGURE 4 illustrates a section of the mixing device according to FIGURE 3 wherein the bottom 38 of the casing 26 has only a single inlet means 39 into the mixing chamber. The inlet means 39 is, however, provided with two inlet openings 40 and 41 right angularly disposed to the direction of flow through the pipe 39. In this embodiment the organic compound having reactive hydrogen atoms is fed through the pipe 39 and the other components are injected through the openings 40 and 41 thus intimately contacting the components prior to mechanically agitating with the stirring mechanism.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. An apparatus for producing porous and homogeneous polyurethane plastics which comprises an enclosed mixing chamber having a top, bottom and a side wall joining said top and bottom, an agitator rotatably disposed within said mixing chamber, said agitator having a free end near said bottom of said chamber and an end driven by a shaft journaled within an opening in said top of said chamber, an inlet means for introducing a plurality of reactants into said chamber near said bottom thereof, said inlet means including a plurality of conduits and an injection means for injecting at least one reactant into another at high pressure and an outlet means for discharging the mixed reactants near said top of said chamber.

2. An apparatus for producing porous and homogeneous polyurethane plastics which comprises an enclosed mixing chamber having a top, a bottom and a side wall joining said top and bottom, said mixing chamber having the configuration of a truncated cone, said bottom of said mixing chamber having the greater cross-sectional dimension, an agitator rotatably disposed within said mixing chamber, said agitator having a configuration complementary to that of said mixing chamber, a shaft journaled within an opening in said top of said chamber and connected to the end of said agitator having the smaller cross-sectional dimension, a means for introducing a plurality of reactants into said chamber near said bottom thereof, said means including a plurality of conduits and an injection means for injecting at least one reactant into another at high pressure, and an outlet means for discharging the mixed reactants near said top of said chamber.

3. An apparatus for producing porous and homogeneous polyurethane plastics which comprises an enclosed mixing chamber having a top, bottom and a side wall joining said top and bottom, an agitator rotatably disposed within said mixing chamber, said agitator having a free end near said bottom of said chamber and an end driven by a shaft journaled within an opening in said top of said chamber, an inlet means for introducing a plurality of reactants into said chamber near said bottom thereof, said inlet means including a plurality of conduits and an injection means for injecting at least one reactant into another at a pressure of from about 20 atmospheres to about 1,000 atmospheres and an outlet means for discharging the mixed reactants near said top of said chamber.

4. An apparatus for producing porous and homogeneous polyurethane plastics which comprises an enclosed mixing chamber having a top, a bottom and a side wall joining said top and bottom, said mixing chamber having the configuration of a truncated cone, said bottom of said mixing chamber having the greater cross-sectional dimension, an agitator rotatably disposed within said mixing chamber, said agitator having a configuration complementary to that of said mixing chamber, a shaft journaled within an opening in said top of said chamber and connected to the end of said agitator having the smaller cross-sectional dimension, a means for introducing a plurality of reactants into said chamber near said bottom thereof, said means including a plurality of conduits and an injection means for injecting at least one reactant into another at a pressure of from about 20 atmospheres to about 1,000 atmospheres and an outlet means for discharging the mixed reactants near said top of said chamber.

5. The apparatus of claim 1 including a means for maintaining the reactants therein at a uniform temperature.

6. The apparatus of claim 2 including a means for maintaining the reactants therein at a uniform temperature.

References Cited in the file of this patent

UNITED STATES PATENTS

| | | |
|---|---|---|
| Re. 24,514 | Hoope et al. | Aug. 12, 1958 |
| 1,885,283 | Ostermann | Nov. 1, 1932 |
| 2,204,180 | Gerhach | June 11, 1940 |
| 2,582,899 | Barnebey et al. | Jan. 15, 1952 |
| 2,592,709 | Kinnaird | Apr. 15, 1952 |
| 2,706,108 | Miner | Apr. 12, 1955 |
| 2,817,500 | Robinson | Dec. 27, 1957 |

FOREIGN PATENTS

| | | |
|---|---|---|
| 129,757 | Great Britain | July 11, 1919 |